(12) United States Patent
Keles

(10) Patent No.: US 10,839,101 B2
(45) Date of Patent: Nov. 17, 2020

(54) PORTABLE STORAGE APPARATUS, TEST SYSTEM AND METHOD

(71) Applicant: Rohde & Schwarz GmbH & Co. KG, Munich (DE)

(72) Inventor: Mustafa Keles, Penzberg (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 308 days.

(21) Appl. No.: 16/146,858

(22) Filed: Sep. 28, 2018

(65) Prior Publication Data

US 2019/0286842 A1 Sep. 19, 2019

(30) Foreign Application Priority Data

Mar. 15, 2018 (EP) .................................... 18161964

(51) Int. Cl.
*G06F 21/62* (2013.01)
*G06F 3/06* (2006.01)
(Continued)

(52) U.S. Cl.
CPC ........ *G06F 21/6245* (2013.01); *G06F 3/0623* (2013.01); *G06F 3/0652* (2013.01);
(Continued)

(58) Field of Classification Search
CPC ...... G06F 21/6245; G06F 21/30; G06F 21/78; G06F 3/0623; G06F 3/0652;
(Continued)

(56) References Cited

U.S. PATENT DOCUMENTS 6,351,817 B1 * 2/2002 Flyntz .................... G06F 21/32
380/202
8,127,145 B2 * 2/2012 O'Brien .............. G06F 21/6218
713/189
(Continued)

FOREIGN PATENT DOCUMENTS

EP 1837795 A1 9/2007

OTHER PUBLICATIONS

Extended European search report for European Patent Application No. 18161964.4, dated Oct. 12, 2018, 8 pages.
(Continued)

*Primary Examiner* — Cheng-Feng Huang
(74) *Attorney, Agent, or Firm* — Westman, Champlin & Koehler, P.A.

(57) ABSTRACT

A portable storage apparatus and method used for storing sensitive data of a user and/or of an external device, said portable storage apparatus comprising an authentication unit adapted to authenticate the user and/or the external device connected to the portable storage device; at least one processing unit adapted to encrypt the sensitive data requiring a high security level, SL, with a secure encryption key, K, loaded from a key storage of the portable storage apparatus; and a switching unit adapted to switch the processing unit to a high security level, SL, data memory of the portable storage apparatus to store the encrypted sensitive data if the high security level, SL, data memory is selected by an authenticated user or by an authenticated external device.

18 Claims, 11 Drawing Sheets

(51) Int. Cl.
*G06F 21/32* (2013.01)
*G06F 21/30* (2013.01)
*G06F 21/78* (2013.01)
*G06F 21/86* (2013.01)

(52) U.S. Cl.
CPC ............ *G06F 3/0673* (2013.01); *G06F 21/30* (2013.01); *G06F 21/32* (2013.01); *G06F 21/6236* (2013.01); *G06F 21/78* (2013.01); *G06F 21/86* (2013.01); *G06F 2221/2113* (2013.01); *G06F 2221/2143* (2013.01)

(58) Field of Classification Search
CPC .... G06F 3/0673; G06F 21/32; G06F 21/6236; G06F 2221/2113; G06F 21/86; G06F 2221/2143; G06F 21/72; G06F 21/602
See application file for complete search history.

(56) References Cited

U.S. PATENT DOCUMENTS

| | | | |
|---|---|---|---|
| 9,043,931 B2 | 5/2015 | Moon | |
| 9,135,459 B2* | 9/2015 | Kim | G06F 21/604 |
| 10,019,605 B2* | 7/2018 | Boysen | G06F 21/60 |
| 2002/0147924 A1* | 10/2002 | Flyntz | G06F 21/32 |
| | | | 726/4 |
| 2006/0139170 A1* | 6/2006 | Ott | G08B 13/149 |
| | | | 340/568.2 |
| 2007/0001845 A1* | 1/2007 | Ott | G08B 13/149 |
| | | | 340/568.1 |
| 2007/0226517 A1* | 9/2007 | O'Brien | G06F 21/6218 |
| | | | 713/189 |
| 2010/0037319 A1 | 2/2010 | Steeves et al. | |
| 2011/0246790 A1* | 10/2011 | Koh | G06F 21/32 |
| | | | 713/193 |
| 2014/0115656 A1* | 4/2014 | Kim | G06F 21/604 |
| | | | 726/1 |
| 2015/0172321 A1* | 6/2015 | Kirti | H04L 63/1416 |
| | | | 726/1 |
| 2015/0356308 A1* | 12/2015 | Kim | G06F 21/62 |
| | | | 726/1 |
| 2016/0292460 A1* | 10/2016 | Boysen | G06F 21/74 |
| 2017/0075821 A1* | 3/2017 | Takahashi | H04L 63/0435 |

OTHER PUBLICATIONS

Amazon listing "Farsler 32GB High-speed Recognition Fingerprint Encrypted Pen Drive Dual Storage Security Memory USB Stick", Retrieved on Amazon.com at https://www.amazon.com/Farsler-High-speed-Recognition-Fingerprint-Encrypted/dp/B01LXPCF9J, on Dec. 2, 2018, 8 pages.

\* cited by examiner

PORTABLE STORAGE APPARATUS, TEST SYSTEM AND METHOD

CROSS-REFERENCE TO RELATED APPLICATION(S)

This application claims priority to European Patent Application No. 18161964.4, filed on Mar. 15, 2018, the content of which is hereby incorporated by reference it its entirety.

TECHNICAL FIELD

The invention relates to a portable storage apparatus for storing sensitive data of a user or of a device on a portable storage apparatus. The invention further relates to a test system and a method for storing sensitive data of a user or of a device.

TECHNICAL BACKGROUND

Portable storage apparatuses are widely used for storing data of users loaded from computers. In conventional portable storage apparatuses, data is stored in a data memory integrated in a housing of the portable storage apparatus. In a conventional portable storage apparatus, sensitive data can be stored in encrypted form. A computer connected to the portable storage apparatus comprises an encryption unit which encrypts the user data and loads the encrypted user data into the data memory of the portable storage apparatus. Other less sensitive data can be stored in the data memory of the portable storage apparatus in not encrypted form. The encrypted data and the not encrypted data are stored at different memory locations within the data memory of the conventional portable storage apparatus. Accordingly, in a conventional portable storage apparatus, sensitive data and less sensitive data are stored in the same data memory.

Data belonging to a user or to an external device such as a test device can require or belong to different security levels which require a different handling of the respective data. For instance, less sensitive data may comprise documents that have been loaded by the user from a public domain such as the internet and which are available to the public. More sensitive data may for instance comprise photographs of the user or text documents created by the user. More sensitive data may also comprise photographs or images of other persons or devices taken by the user which should not become public. Even more sensitive data can comprise test results generated by a test device or a device under test such as a prototype or highly confidential text documents such as contracts or government documents. Data and/or data files can therefore belong to a specific security level which may be defined by the user or by the use case.

Conventionally, data belonging to different security levels have been transported by separate portable storage apparatuses. For instance, data with a low security level have been stored mostly in not encrypted form on a conventional USB memory stick. However, more sensitive data have been transported in encrypted form in other portable storage apparatuses used for transporting sensitive data.

Portable storage apparatus designed for transporting sensitive data may comprise an authentication unit such as a fingerprint authentication unit which allows access to the data memory of the portable storage apparatus only after a user has been successfully been authenticated by the authentication unit of the portable storage apparatus.

The transport of heterogeneous data with different security levels by separate portable storage apparatuses has the disadvantage that a user has to carry with him different portable storage apparatuses used for data of a specific levels. The use of different portable storage apparatuses increases the complexity of handling the stored data. For instance, a user might not be aware in which portable storage apparatus he has stored specific data and may carry the wrong portable storage apparatus to a meeting where he wants to present the data. Further, with the increasing number of portable storage apparatuses necessary to store data with different security levels, the probability that one of the portable storage apparatuses gets lost is increasing.

SUMMARY OF THE INVENTION

Accordingly, there is a need to store heterogeneous data of different security levels of the same portable storage apparatus in a secure way.

This object is achieved according to a first aspect of the present invention by a portable storage apparatus comprising the features of claim 1.

The invention provides according to the first aspect a portable storage apparatus used for storing sensitive data of a user and/or of an external device, said portable storage apparatus comprising: an authentication unit adapted to authenticate the user and/or the external device connected to the portable storage device, at least one processing unit adapted to encrypt the sensitive data requiring a high security level with a secure encryption key loaded from a key storage of the portable storage apparatus and a switching unit adapted to switch the processing unit to a high security level data memory of the portable storage apparatus to store the encrypted sensitive data if the high security level data memory is selected by an authenticated user or by an authenticated external device.

In a possible embodiment of the portable storage apparatus according to the first aspect of the present invention, the portable storage apparatus further comprises at least one low security level data memory adapted to store encrypted or not encrypted less sensitive data requiring a lower security level.

In a further possible embodiment of the portable storage apparatus according to the first aspect of the present invention, the high security level data memory and the at least one low security level data memory are connected to the switching unit adapted to selectively switch one of the data memories to the processing unit in response to a security level selection control signal generated by the authenticated user and/or by the authenticated external device.

In a still further possible embodiment of the portable storage apparatus according to the first aspect of the present invention, a processing mode of the processing unit is adjusted in response to the security level selection control signal generated by the authenticated user and/or by the authenticated external device.

In a further possible embodiment of the portable storage apparatus according to the first aspect of the present invention, the authentication unit is adapted to enable a security level selection unit of the portable storage apparatus if a user or a connected external device has been successfully authenticated by the authentication unit.

In a further possible embodiment of the portable storage apparatus according to the first aspect of the present invention, the enabled security level selection unit is adapted to generate the security level selection control signal in response to a user selection input of a user or in response to a device selection input signal received from the external device.

In a still further possible embodiment of the portable storage apparatus according to the first aspect of the present invention, the authentication unit comprises a hidden or visible biometric authentication unit adapted to authenticate a user based on biometric characteristics of the user.

In a still further possible embodiment of the portable storage apparatus according to the first aspect of the present invention, the authentication unit comprises an interface to receive user identification data input by the user and/or to receive device identification data of the external device to which the portable storage apparatus is connected.

In a further possible embodiment of the portable storage apparatus according to the first aspect of the present invention, the processing unit comprises an encryption logic and a decryption logic.

In a further possible embodiment of the portable storage apparatus according to the first aspect of the present invention, the encryption logic of the processing unit is adapted to encrypt data received by a data port of said portable storage apparatus, wherein the encryption is performed depending on the current processing mode using encryption keys selected according to the current processing mode of the processing unit.

In a further possible embodiment of the portable storage apparatus according to the first aspect of the present invention, the decryption logic of the processing unit is adapted to decrypt encrypted data read from a data memory of the portable storage apparatus selectively switched by the switching unit to the processing unit in response to the security level selection control signal using decryption keys selected according to the current processing mode of the processing unit.

In a further possible embodiment of the portable storage apparatus according to the first aspect of the present invention, the high security level data memory is surrounded by a tamper-proof casing.

In a further possible embodiment of the portable storage apparatus according to the first aspect of the present invention, the encrypted sensitive data stored in the high security level data memory of the portable storage apparatus is automatically deleted if an intrusion into a housing of the portable storage apparatus and/or into the tamper-proof casing of the high security level data memory is detected by an intrusion detector of the portable storage apparatus.

In a still further possible embodiment of the portable storage apparatus according to the first aspect of the present invention, a protection logic is configured to count a number of unsuccessful authorization attempts made by a user or by an external device and to delete the encrypted sensitive data stored in the high security level data memory if the number of unsuccessful authorization attempts exceeds a threshold value.

In a further possible embodiment of the portable storage apparatus according to the first aspect of the present invention, the high security level data memory is provided in a separate plug-in storage component plugged into a basis storage component to connect the high security level data memory with the switching unit provided in the basis storage component.

In a further possible embodiment of the portable storage apparatus according to the first aspect of the present invention, the portable storage apparatus is integrated in the housing of a pen including a biometric authentication unit adapted to authenticate a user using the pen for writing based on sensed characteristics of the user's writing operation and/or writing results.

In a still further possible embodiment of the portable storage apparatus according to the first aspect of the present invention, the apparatus comprises at least one data port receiving input data which are encrypted by the encryption logic of the processing unit and providing output data decrypted by the decryption logic of the processing unit.

In a further possible embodiment of the portable storage apparatus according to the first aspect of the present invention, the data port is connected with an external test device to receive test results as sensitive data from the test device and the authentication unit is adapted to authenticate the external test device on the basis of test device identification data received from the test device.

In a still further possible embodiment of the portable storage apparatus according to the first aspect of the present invention, the high security level data memory is a hidden data memory.

In a still further possible embodiment of the portable storage apparatus according to the first aspect of the present invention, the whole portable storage apparatus or at least a separate plug-in storage component including the high security level data memory of the portable storage apparatus is integrated in or enclosed by a camouflage product.

The invention further provides according to a second aspect a test system comprising the features of claim 17.

The invention provides according to the second aspect a test system comprising a test device adapted to test at least one device under test and a portable storage apparatus connectable to the test device and adapted to store test results generated by the test device as sensitive data in encrypted form in a high security level data memory of the portable storage apparatus according to the first aspect of the present invention.

The invention further provides according to a third aspect a method for storing sensitive data of a user or of a device comprising the features of claim 18.

The invention provides according to the third aspect a method for storing sensitive data of a user or of a device, wherein the method comprises the steps of: authenticating a user of a portable storage apparatus and/or a device connected to the portable storage apparatus, encrypting the sensitive data of the authenticated user and/or authenticated device with a secure encryption key loaded from a key storage of the portable storage apparatus, and storing the encrypted sensitive data in a high security level data memory of the portable storage apparatus if the high security level data memory is selected by the authenticated user and/or by the authenticated device.

In a possible embodiment of the method according to the third aspect of the present invention, the sensitive data comprises test results generated by a test device connected to the portable storage apparatus.

In a further possible embodiment of the method according to the third aspect of the present invention, the encrypted sensitive data is automatically deleted from the high sensitive level data memory if an intrusion into the housing of the portable storage apparatus and/or into a tamper-proof casing of the high security level data memory is detected.

CONTENT OF THE DRAWINGS

In the following, possible embodiments of the different aspects of the present invention are described in more detail with reference to the enclosed figures.

Figure 1:
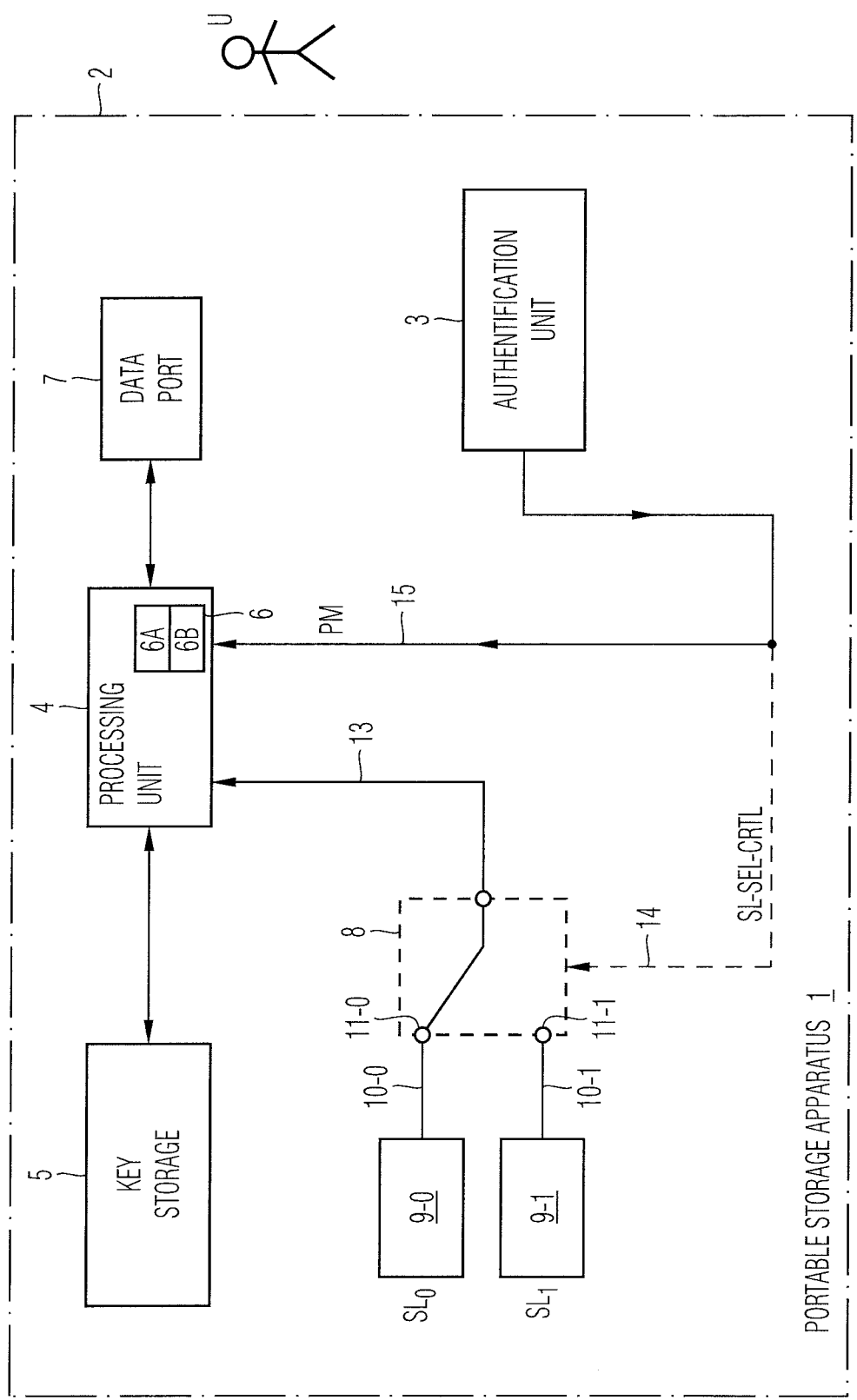
FIG. 1 shows a block diagram of a possible exemplary basic embodiment of the portable storage apparatus according to the first aspect of the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DESCRIPTION OF EMBODIMENTS

As can be seen from the block diagram of FIG. 1, a portable storage apparatus 1 according to the first aspect of the present invention can comprise a housing 2 including several hardware components. The portable storage apparatus 1 as illustrated in FIG. 1 can be used for storing sensitive data of a user U as illustrated in FIG. 1 and/or of an external device, in particular an external test device or measurement equipment as illustrated in the use case of FIG. 11. In the illustrated embodiment of FIG. 1, the portable storage apparatus 1 comprises an authentication unit 3. The authentication unit 3 is adapted to authenticate the user U and/or the external device connected to the portable storage device 1 such as the test device shown in FIG. 11. The portable storage apparatus 1 further comprises a processing unit 4 adapted to encrypt sensitive data requiring a high security level SL with a secure encryption key K loaded from a key storage 5 of the portable storage apparatus 1. The processing unit 4 can comprise one or more processors and can include in a possible embodiment of an encryption logic 6A as well as a decryption logic 6B. In the illustrated embodiment of FIG. 1, the processing unit 4 comprises an encryption logic 6A and a decryption logic 6B. In the illustrated embodiment, the processing unit 4 comprises an interface connecting the processing unit 4 internally to at least one data port 7 of the portable storage apparatus 1. The encryption logic 6A of the processing unit 4 is adapted to encrypt data received by the data port 7 of the portable storage apparatus 1. The encryption is performed depending on a current processing mode PM using encryption keys EK selected according to the current processing mode PM of the processing unit 4. The decryption logic 6B of the processing unit 4 is adapted to decrypt encrypted data read from a data memory of the portable storage apparatus 1 and selectively switched by a switching unit 8 of the portable storage apparatus 1 to the processing unit 4. The switching unit 8 can be controlled by the authentication unit 3. In a possible embodiment, the data memory of the portable storage apparatus 1 is selectively switched by the switching unit 8 to the processing unit 4 in response to a security level selection control signal SL-SEL-CRTL using decryption keys DK selected according to the current processing mode PM of the processing unit 4.

Figure 2:
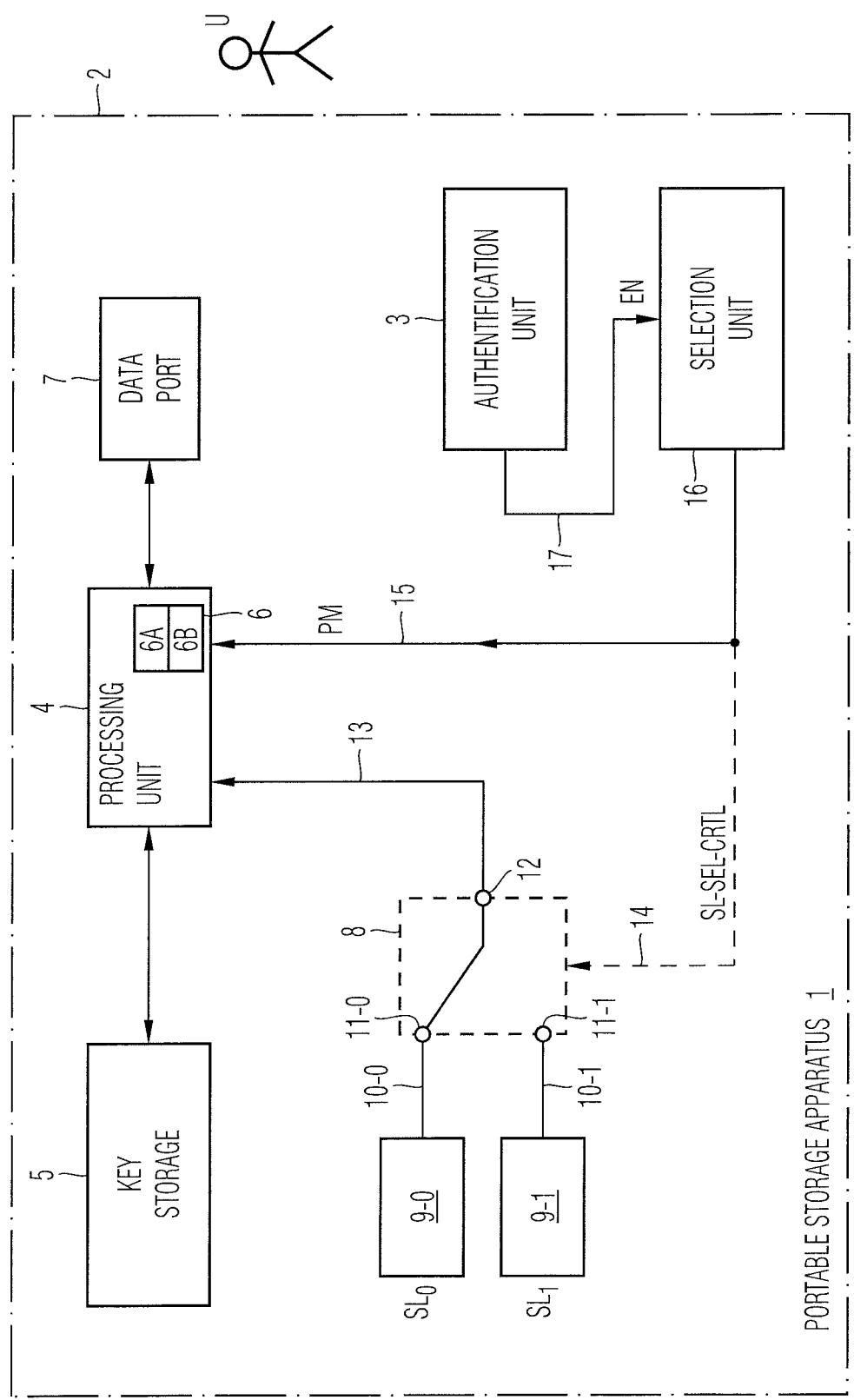
FIG. 2 shows a further block diagram of a possible exemplary embodiment of the portable storage apparatus according to the first aspect of the present invention.

The portable storage apparatus 1 according to the first aspect of the present invention as illustrated in the embodiment of FIG. 1 comprises a switching unit 8 which is adapted to switch the processing unit 4 to a high security level data memory of the portable storage apparatus 1 to store the encrypted sensitive data if the high security level data memory is selected by an authenticated user or by an authenticated external device. In the illustrated embodiment of FIG. 1, the portable storage apparatus 1 comprises a low security level data memory 9-0 for a low security level SL0 and a high security level data memory 9-1 for a high security level SL1. In the embodiment of FIG. 1, the portable storage apparatus 1 is adapted to store data belonging to two different security levels SL0, SL1. In other embodiments, the number of security levels SL can vary and the portable storage apparatus 1 may comprise more data memories 9-$i$ provided for different security levels SL. In the illustrated embodiment of FIG. 1, the at least one low security level data memory 9-0 is adapted to store less sensitive data requiring a lower security level SL0. In a possible embodiment, the low security level data memory 9-0 is adapted to either store encrypted or not encrypted less sensitive data requiring the low security level SL0. The high security level data memory 9-1 of the portable storage apparatus 1 shown in FIG. 1 is adapted to store encrypted sensitive data received from the encryption logic 6A of the processing unit 4 through the switching unit 8. The at least one low security level data memory 9-0 and the high security level data memory 9-1 are both connected to the switching unit 8 as illustrated in FIG. 1. In the illustrated embodiment of FIG. 1, the low security level data memory 9-0 is connected through a signal or data line 10-0 to a terminal 11-0 of the switching unit 8. Further, the high security level data memory 9-1 is connected through a data signal line 10-1 to a second connection terminal 11-1 of the switching unit 8. The switching unit 8 is implemented in a preferred embodiment as a hardware component. The switching unit 8 has a connection terminal 12 connecting the switching unit 8 internally via a signal data line 13 to the processing unit 4. The switching unit 8 is controlled through a control signal line 14 as shown in FIG. 1. In a possible embodiment, the switching unit 8 receives a security level selection control SL-SEL-CRTL from the authentication unit 3 as shown in FIG. 1. In a possible embodiment, the security level selection control signal SL-SEL-CRTL is also applied via an internal signal line 15 to the processing unit 4 defining a processing mode PM of the processing unit 4. In this embodiment, the processing mode PM of the processing unit 4 corresponds to the data memory selected by the authentication unit 3 by means of the security level selection control signal SL-SEL-CRTL. Accordingly, if the low security level data memory 9-0 has been switched to the processing unit 4 by the selection unit 16 in response to the selection control signal, the processing unit 4 is operated in a corresponding processing mode PM-SL0 adapted for the low security level SL0. On the contrary, if the high security level data memory 9-1 has been switched by the authentication unit 3 to the processing unit 4 by means of the security level selection control signal SE-SEL-CRTL, the processing unit 4 is also switched to another processing mode PMSL1 corresponding to the high security level SL1. The switching unit 8 is adapted to selectively switch one of the data memories 9-i to the processing unit 4 in response to the received security level selection control signal SL-SEL-CRTL. In the illustrated embodiment of FIG. 1, the security level selection control signal SL-SEL-CRTL is directly generated by the authentication unit 3 depending on the authentication result. In a possible alternative embodiment, the selection of the data memories 9-i is performed by a security level selection unit 16 as illustrated in the embodiment of FIG. 2. In the embodiment of FIG. 1, a first user U1 having less sensitive or confidential data can be authenticated by the authentication unit 3 to generate a security level selection control signal SL-SEL-CRTL switching automatically to the low security level data memory 9-0 by means of the switching unit 8 to the processing unit 4 to store the less sensitive data of the user U1 either in encrypted form or even in unencrypted form into the data memory 9-0. Another user U2 having high confidential data is authenticated by the authentication unit 3 and the authentication unit 3 can automatically switch over to the high security level data memory 9-1 storing the sensitive data after encryption with a secure encryption key EK loaded from the key storage 5. In the key storage 5, different sets of encryption keys EK and/or decryption keys DK can be stored for different security levels SL. For instance, for a low security level SL, a relatively short encryption key EK can be stored and used for encrypting the low sensitive data memorized in the at least one low security level data memory 9-0. For a high security level SL, a more secure or longer encryption key K can be loaded from the key storage 5 and used for encrypting the respective data by the encryption logic 6A of the processing unit 4 to be stored in the high security level data memory 9-1 of the portable storage apparatus 1. For instance, sensitive data of a user having confidential data can be encrypted with a high secure long encryption key EK-SL1 whereas less sensitive data of another user are not encrypted at all or may be encrypted with a less secure shorter encryption key EK-SL0 loaded from the key storage 5.

The authentication unit 3 illustrated in the embodiment of FIG. 1 can comprise a hidden or visible biometric authentication unit adapted to authenticate a user U based on biometric characteristics of the user. For instance, the authentication unit 3 can comprise a fingerprint authentication unit or any other kind of biometric authentication unit adapted to authenticate a user from biometric characteristics of the user U such as an iris scanner, etc. In the embodiment illustrated in FIG. 1, the switching between data memories 9-i of different security levels SL is performed automatically in response to the biometric characteristics of the user. In a preferred alternative embodiment, the authenticated user can perform a selection to which data memory what kind of data is stored within the portable storage apparatus 1. In this embodiment, the authenticated user can perform a selection of the data memory by means of a security level selection unit 16 enabled by the authentication unit 3 as illustrated in the embodiment of FIG. 2.

In a preferred embodiment, the key storage 5 is integrated in the housing 2 of the portable storage apparatus 1. In a further possible embodiment, the key storage 5 is plugged temporarily into the portable storage apparatus 1 for performing an encryption and/or decryption process. The data port 7 is provided for bidirectional data exchange with an external electronic device. The data port 7 can comprise a serial or parallel data port 7 adapted to receive data from an external electronic device and to output data to the electronic device.

The authentication unit 3 can comprise in a possible implementation a biometric authentication unit. The authentication unit 3 may further comprise in a possible embodiment an interface to receive user identification data input by the user and/or to receive device identification data of an external device to which the portable storage apparatus 1 is connected.

Figure 11:
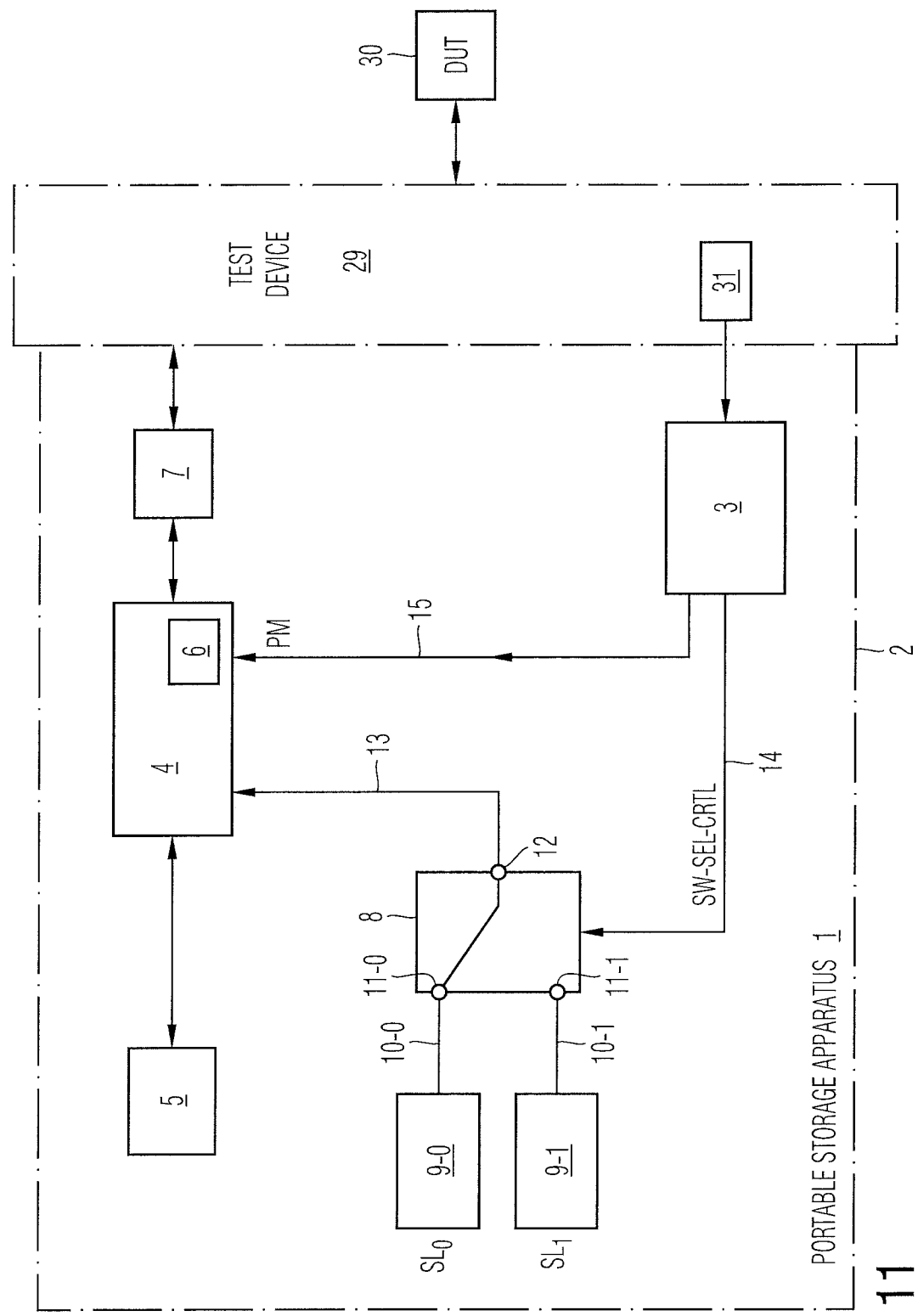
FIG. 11 shows a block diagram of a possible use case for portable storage apparatus according to the first aspect of the present invention.

In a possible embodiment, the high security level SL data memory 9-1 can be surrounded by a tamper-proof casing 28. In a possible embodiment, the encrypted sensitive data stored in the high security level SL data memory 9-1 can be automatically deleted if an intrusion into the housing 2 of the portable storage apparatus 1 and/or into a tamper-proof casing 28 of the data memory 9-1 is detected by an intrusion detector of the portable storage apparatus 1. A tamper-proof casing of the high security level data memory 9-1 is for example illustrated in FIG. 8. The data port 7 is adapted to receive input data encrypted by the encryption logic 6A of the processing unit 4 and provides output data decrypted by the decryption logic 6B of the processing unit 4. In a possible embodiment, the data port 7 can be connected to an external test device or test equipment to receive test results TR as sensitive data from the test device 29 as shown in FIG. 11. In this embodiment, the authentication unit 3 can be adapted to authenticate the external test device 29 on the basis of test device identification data received from the test device 29.

In a possible embodiment, the portable storage apparatus 1 as illustrated in the embodiment of FIG. 1 can be integrated or enclosed by a camouflage product. Additional protection for the high sensitive data is provided in a scenario where if a finder or a third person getting hold of the portable storage apparatus 1 does not even become aware that he is in possession of a portable storage apparatus 1 including data of a user or device. The portable storage apparatus 1 can be integrated or enclosed in a camouflage product, i.e. a product of common use carried by a user. Such a camouflage product can be for instance a pen or for instance a lipstick if the user is a woman. A third person without knowing that he is in possession of a portable storage apparatus 1 will not try to get access to sensitive data stored in a high security level data memory 9-1 integrated in the portable storage apparatus 1 which in turn is integrated in the camouflage product.

The portable storage apparatus 1 as illustrated in the embodiment of FIG. 1 can comprise additional components as illustrated in FIG. 1. In a possible embodiment, the portable storage apparatus 1 comprises a local power supply unit adapted to provide power supply at least for the processing unit 4 and the authentication unit 3. The integrated power supply unit can also be connected to a power supply harvesting unit which generates electrical power in response to mechanical forces applied to the portable storage apparatus 1. Further, the local power supply integrated in the housing 2 of the portable storage apparatus 1 can also comprise photovoltaic cells generating electrical power from sun rays.

In a further possible embodiment, the portable storage apparatus 1 can also comprise a configuration unit which can be used in a configuration setup of the portable storage apparatus device to allocate or assign different memories 9-$i$ within the portable storage apparatus 1 to different security levels SL.

FIG. 2 shows a possible exemplary embodiment of a portable storage apparatus 1 according to the first aspect of the present invention.

In the illustrated embodiment of FIG. 2, the portable storage apparatus 1 comprises a security level SL selection unit 16 controlled by the authentication unit 3. The authentication unit 3 supplies an enable signal EN to a control line 17 to the security level selection unit 16 in case that an external device and/or a user has been successfully authenticated by the authentication unit 3. Accordingly, after successful authentication, the security level selection unit 16 is activated or enabled. The enabled security level selection unit 16 is adapted to generate the security level selection control signal SL-SEL-CRTL in response to a user selection input of a user or in response to a device selection input signal received from the authenticated external device. In the illustrated embodiment of FIG. 2, a user can for instance decide whether data is less sensitive and can be stored in the low level security data memory 9-0 or is sensitive data which has to be stored in the high security level data memory 9-1. If only two different security level data memories are provided, the security level selection control unit 16 can be formed by a press button to generate a control bit applied to the switching unit 8. For instance, if the user is of the opinion that the data is sensitive, he can press the press button of the security level selection unit 16 which switches the switching unit 8 into a switch position where the high security level data memory 9-1 is connected to the processing unit 4 including the encryption and decryption logic. In response to the security level selection control signal SE-SEL-CRTL provided by the enabled security level selection unit 16, the processing mode PM of the processing unit 4 is automatically switched to a high security level processing mode PM-SL1 where the received sensitive data is encrypted automatically by the encryption logic 6A of the processing unit 4 with secure long encryption keys EK loaded from the key storage 5 of the portable storage apparatus 1. If the portable storage apparatus 1 comprises more than two different security level data memories, the security level selection unit 16 can comprise a keypad with several press buttons associated to the different data memories.

Figure 3:
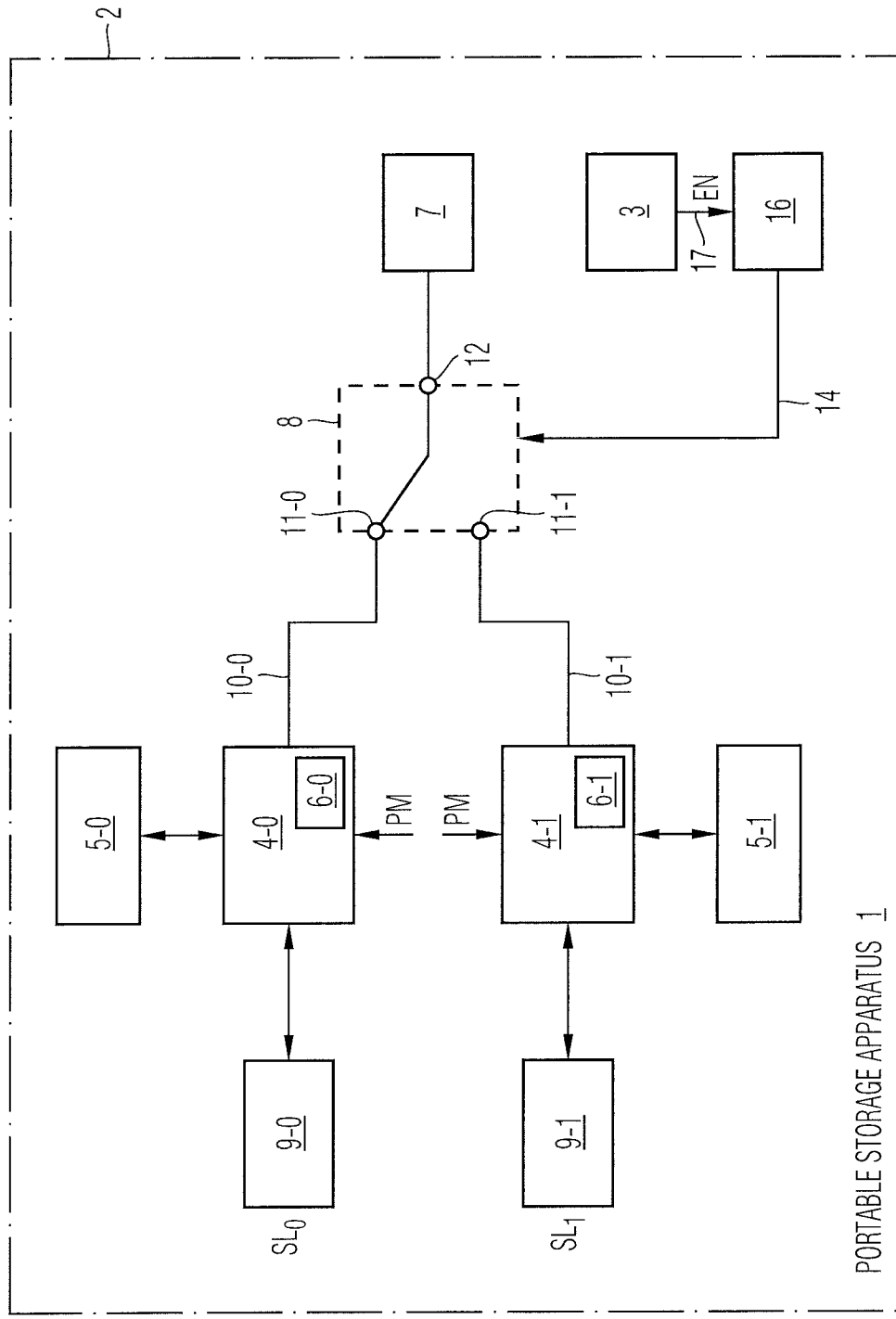
FIG. 3 shows a further block diagram of a possible exemplary embodiment of the portable storage apparatus according to the first aspect of the present invention.

FIG. 3 shows a further exemplary embodiment of a portable storage apparatus 1 according to the first aspect of the present invention.

In the illustrated embodiment of FIG. 3, the portable storage apparatus 1 comprises separate processing units 4-$i$ for different security levels SL. In the illustrated embodiment of FIG. 3, a first low security level processing unit 4-0 is provided for a low security level data memory 9-0. Further, a high security level processing unit 4-1 is provided for a high security level data memory 9-1. Further, in the illustrated embodiment of FIG. 3, there are separate key storages 5-$i$ provided for the different security levels. A first key storage 5-0 is connected to the low security level processing unit 4-0 and a high security level key storage 5-1 is connected to the high security level processing unit 4-1. If the less sensitive data is not stored in encrypted form the provision of a low security level key storage 5-0 is not necessary. In the illustrated embodiment of FIG. 3, the switching unit 8 controlled by the selection unit 16 is provided between the data port 7 and the two parallel processing units 4-0, 4-1. The processing modes PM of the two processing units 4-0, 4-1 are also controlled by the security level selection control signal SL-SEL-CRTL generated by the selection unit 16. Each processing unit 4 comprises in the illustrated embodiment an integrated encryption unit 6A and an integrated decryption unit 6B.

Figure 4:
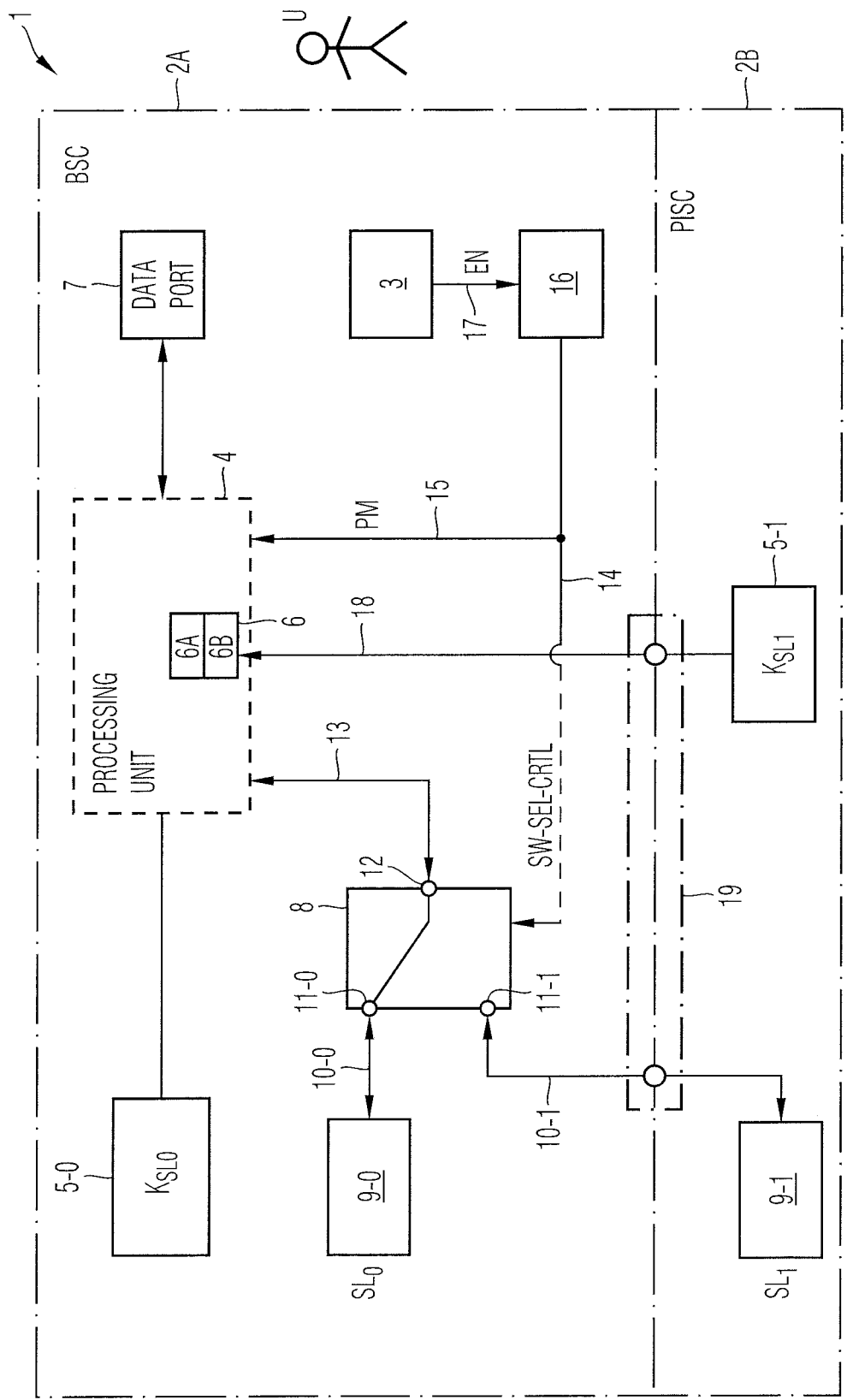
FIG. 4 shows a block diagram of a further possible exemplary embodiment of a portable storage apparatus according to the first aspect of the present invention.

FIG. 4 shows a further possible exemplary embodiment of a portable storage apparatus 1 according to the first aspect of the present invention. In the illustrated embodiment of FIG. 4, the portable storage apparatus 1 comprises a housing 2 including a first housing 2A of a basis storage component BSC and a second plug-in housing 2B of a plug-in storage component PISC. In the illustrated embodiment of FIG. 4, a high security level SL data memory 9-1 for the high security level SL1 is provided in the separate plug-in storage component integrated in the housing 2B and plugged into the housing 2A of the basis storage component BSC to connect the high security level SL data memory 9-1 with the switching unit 8 provided in the basis storage component BSC as shown in FIG. 4. In the illustrated embodiment of FIG. 4, the portable storage apparatus 1 comprises two separate key storages 5-0, 5-1. The first key storage 5-0 is provided for storing encryption keys EK used for encrypting the less sensitive data stored in the low security level data memory 90 integrated in the housing 2A of the basis storage component BSC. The secure encryption keys EK used for encrypting the sensitive data are stored in the illustrated embodiment also in the housing 2B of the plug-in storage component PISC and are loaded by the processing unit 4 through a separate line 18 after the plug-in storage component PISC has been plugged into the basis storage component BSC and the user has selected the high security level data memory 9-1 to store sensitive data in encrypted form via the selection unit 16. After the sensitive data has been stored in encrypted form in the high security level data memory 9-1, the plug-in storage component PISC might be separated by the user from the basis storage component BSC to increase security. A third person which gets hold of the plug-in storage component PISC cannot read the data stored in the high security level data memory 9-1 because the data interface 19 between the plug-in storage component PISC and the basis storage component BSC is in a preferred embodiment formed by a non-standard interface. Accordingly, the data interface 19 between the plug-in storage component PISC and the basis storage component BSC is in a preferred embodiment a non-standard conform data interface allowing only a connection between a plug-in storage component PISC and a corresponding basis storage component BSC. In a further possible embodiment, the key storage 5-1 for the high security encryption keys EK can also be integrated in the basis storage component BSC so that the plug-in storage component PISC comprises only a high security level data memory 9-1 as shown in FIG. 4.

Figure 5:
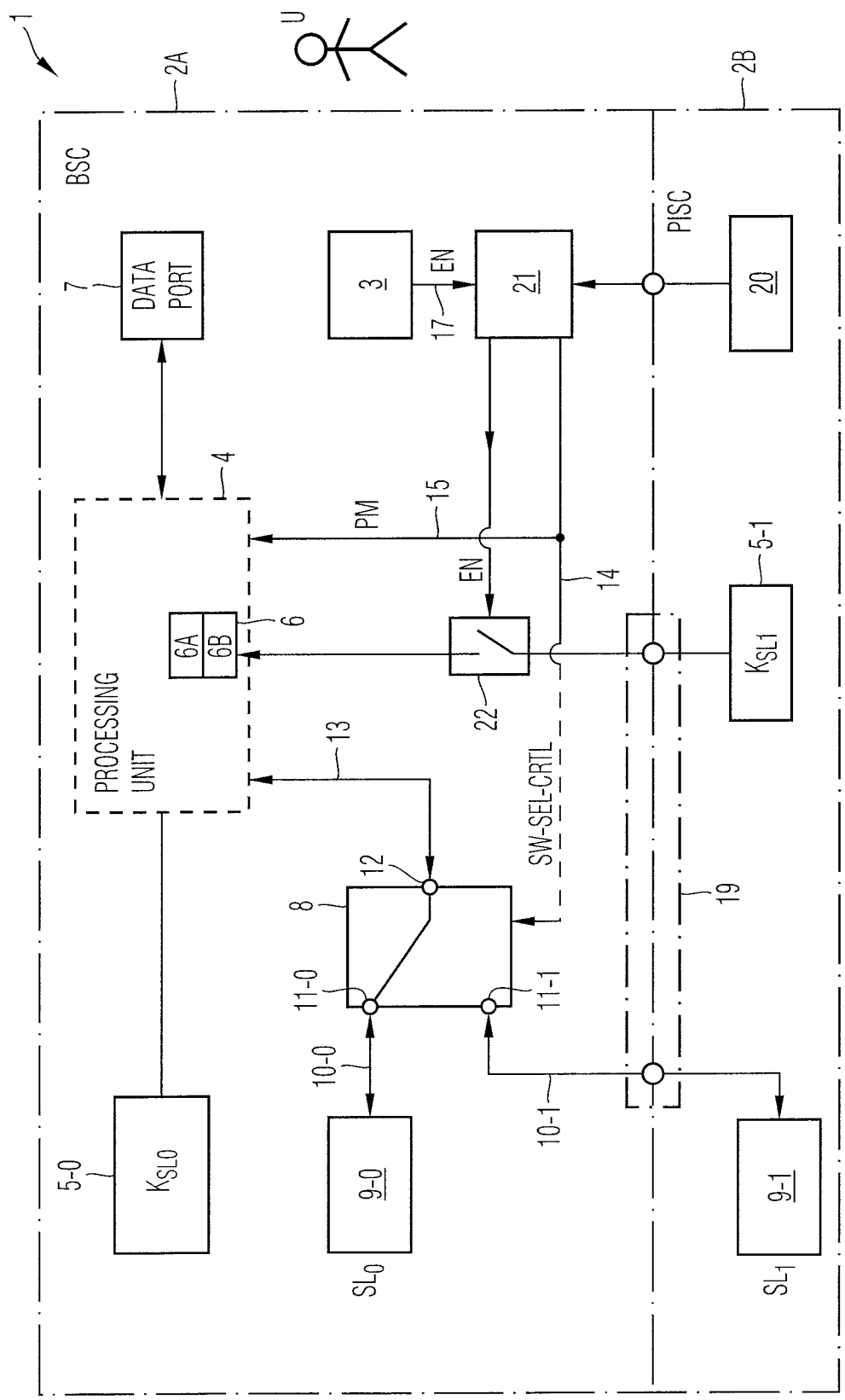
FIG. 5 shows a further block diagram of a possible exemplary embodiment of a portable storage apparatus according to the first aspect of the present invention.

FIG. 5 shows a further possible exemplary embodiment of a portable storage apparatus 1 according to the first aspect of the present invention. In the illustrated embodiment of FIG. 5, the plug-in storage component PISC further comprises a plug-in component identifier memory 20 which can be connected to a plug-in detection and authentication unit 21 of the basis storage component BSC within the housing 2A of the portable storage apparatus 1. The plug-in component detection and authentication unit 21 can be enabled in a possible embodiment by the authentication unit 3 as illustrated in FIG. 5. In the illustrated embodiment of FIG. 5, the plug-in component detection unit 21 controls the switching unit 8 to switch between the low security level data memory 9-0 and the high security level data memory 9-1 integrated in the plug-in storage component PISC. Accordingly, if the plug-in storage component PISC is successfully authenticated by the authentication unit 21 on the basis of the received plug-in component identifier, the detection and authentication unit 21 switches the switching unit 8 automatically such that the high security level data memory 9-1 integrated in the plug-in storage component PISC is connected to the processing unit 4 to receive encrypted data from the processing unit 4 or to provide encrypted data for decryption by the decryption logic 6B of the processing 4. The embodiment of FIG. 5 the plug-in storage components PISC can be inserted into the data interface 19 for receiving encrypted sensitive data. In the illustrated embodiment of FIG. 5, the detection and authentication unit 21 can further control a switch integrated in the basis storage component BSC such that the secure encryption keys EK stored in the key storage 5-1 of the plug-in storage component PISC are only loaded in the encryption and/or decryption logic of the processing unit 4 after the plug-in storage component PISC has been successfully authenticated by the detection and authentication unit 21 of the basis storage component BSC.

Figure 6A:
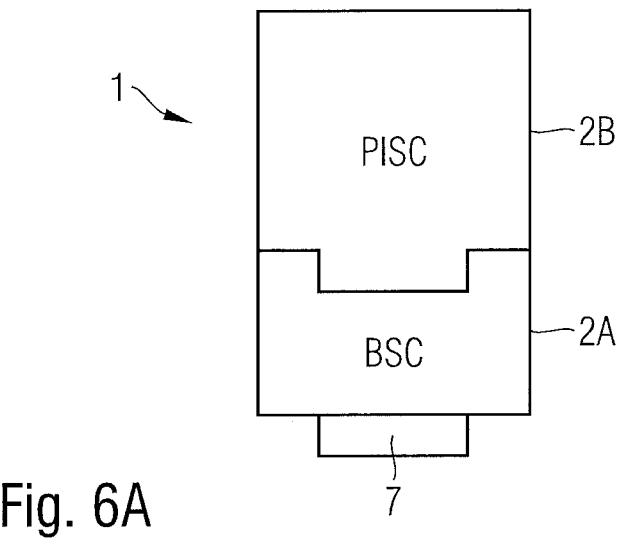
FIGS. 6A, 6B show schematically possible exemplary embodiments of a portable storage apparatus according to the first aspect of the present invention.

FIG. 6A illustrates possible exemplary embodiments of the portable storage apparatus 1 comprising a basis storage component BSC. The embodiment shown in FIG. 6A shows a single plug-in storage component PISC with a housing 2B plugged into a housing 2A of a basis storage component BSC of the portable storage apparatus 1. In the illustrated embodiment of FIG. 6A, the basis storage component BSC comprises a data port 7 for exchanging data with external electronic devices. The plug-in storage component PISC comprises the integrated high security level data memory 9-1 as shown in FIG. 5. A user may plug in the plug-in storage component PISC into the basis storage component BSC either to save encrypted sensitive data into the high security level data memory 9-1 or to read out encrypted high sensitive data from the memory 9-1 for decryption and for loading the decrypted data via the data port 7 to a memory of the external electronic device. After having performed the encryption or decryption, the plug-in storage component PISC can be separated by the user U from the basic storage component BSC and the user U may carry the two storage components BSC, PISC separately. Accordingly, for a third party getting hold of the plug-in storage component PISC integrated in the housing 2B, it becomes harder to read out the encrypted data from the high security level data memory 9-1 if the data interface 19 is not a standard data interface. Further, the key storage 5 for the high security keys K can also be included in the basis storage component BSC and therefore separated from the data stored in the plug-in storage component PISC.

Figure 6B:
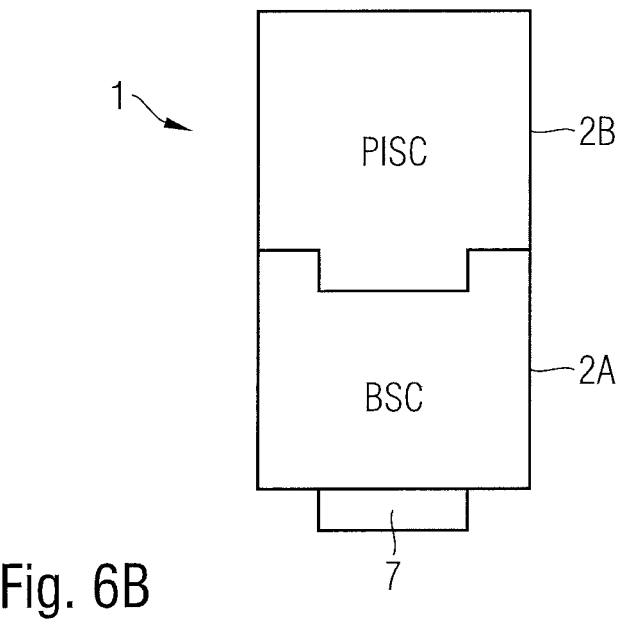

In the embodiment illustrated in FIG. 6B, several plug-in storage components PISC can be stacked upon each other and connected to the basis storage component BSC. In the illustrated embodiment of FIG. 6B, the most sensitive data can be stored in a high security level data memory 9-1 integrated in the plug-in storage component PISC2 and are only accessible by the basis storage component BSC if a person or user has possession of all three components, i.e. has possession of the basic storage component BSC, a first plug-in storage component PISC1 and the plug-in storage component PISC2. The three different components can be separated and carried separately or even by different users or persons to increase safety and security.

Figure 7:
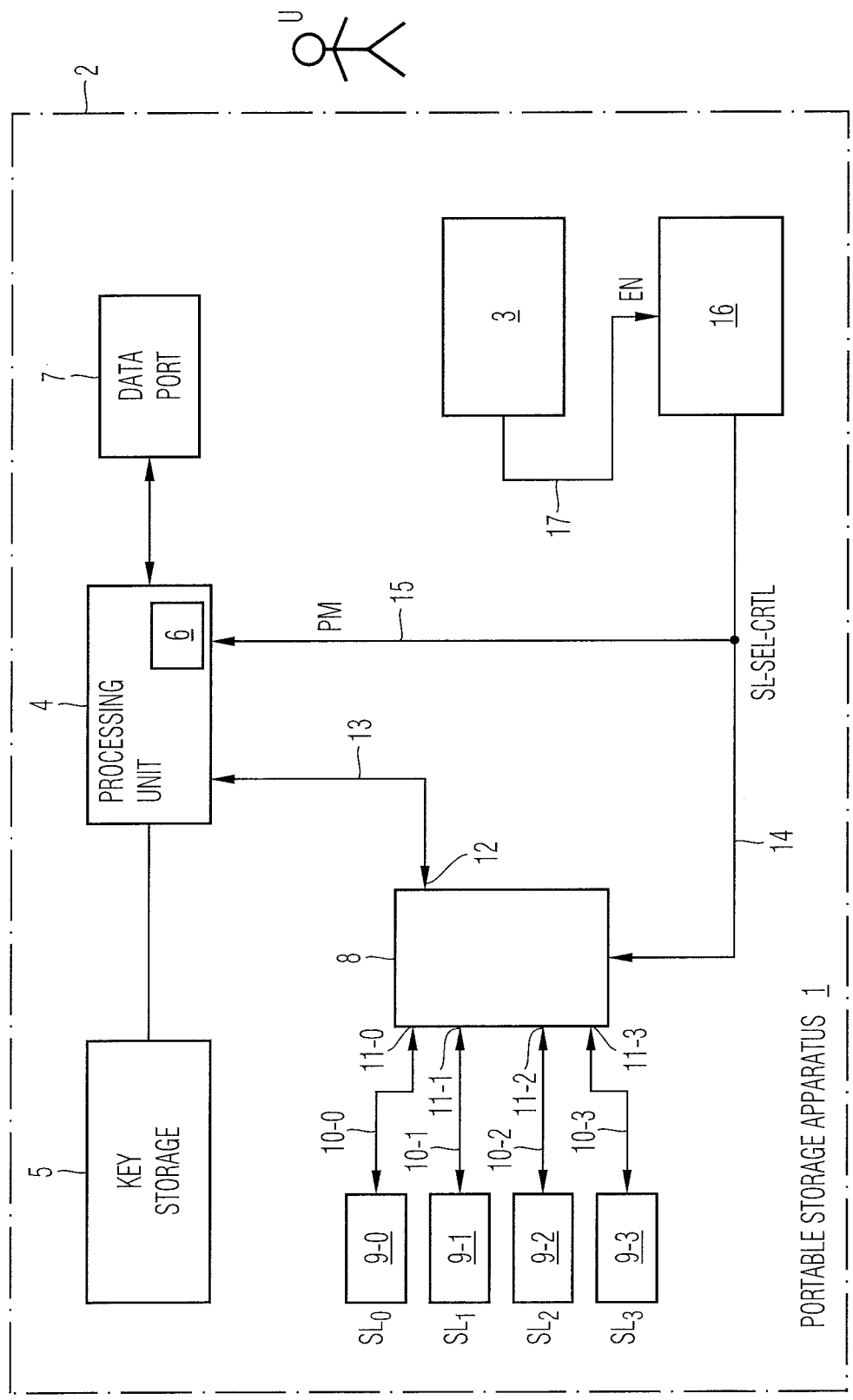
FIG. 7 shows a block diagram of a further possible exemplary embodiment of a portable storage apparatus according to the first aspect of the present invention.

FIG. 7 shows a further exemplary embodiment of a portable storage apparatus 1 according to the first aspect of the present invention. In the illustrated embodiment, the portable storage apparatus 1 comprises more than two different security level data memories. In the illustrated embodiment, the portable storage apparatus 1 comprises four different data memories 9-0, 9-1, 9-2, 9-3 for different security levels SL0, SL1, SL2, SL3. For instance, the security level SL3 can comprise the highest security level for the most sensitive data. The memory 9-0 may comprise the data memory for the data with the lowest security level SL0. The number of security level data memories 9-$i$ can vary depending on the use case. In the illustrated embodiment of FIG. 7, the switching unit 8 is formed by a multiplexing/demultiplexing switching unit controlled by the selection unit 16. The multiplexing/demultiplexing switching unit 8 can switch one of the four different data memories 9-0 to the processing unit 4 in response to the switched selection control signal SW-SEL-CRTL provided by the selection unit 16. In the illustrated embodiment, the processing unit 4 can further be switched between two different processing modes PM according to the control signal provided by the selection unit 16. Different encryption keys EK and decryption keys DK for the different security levels SL can be stored in the illustrated embodiment in the key storage 5 of the portable storage apparatus 1.

Figure 8:
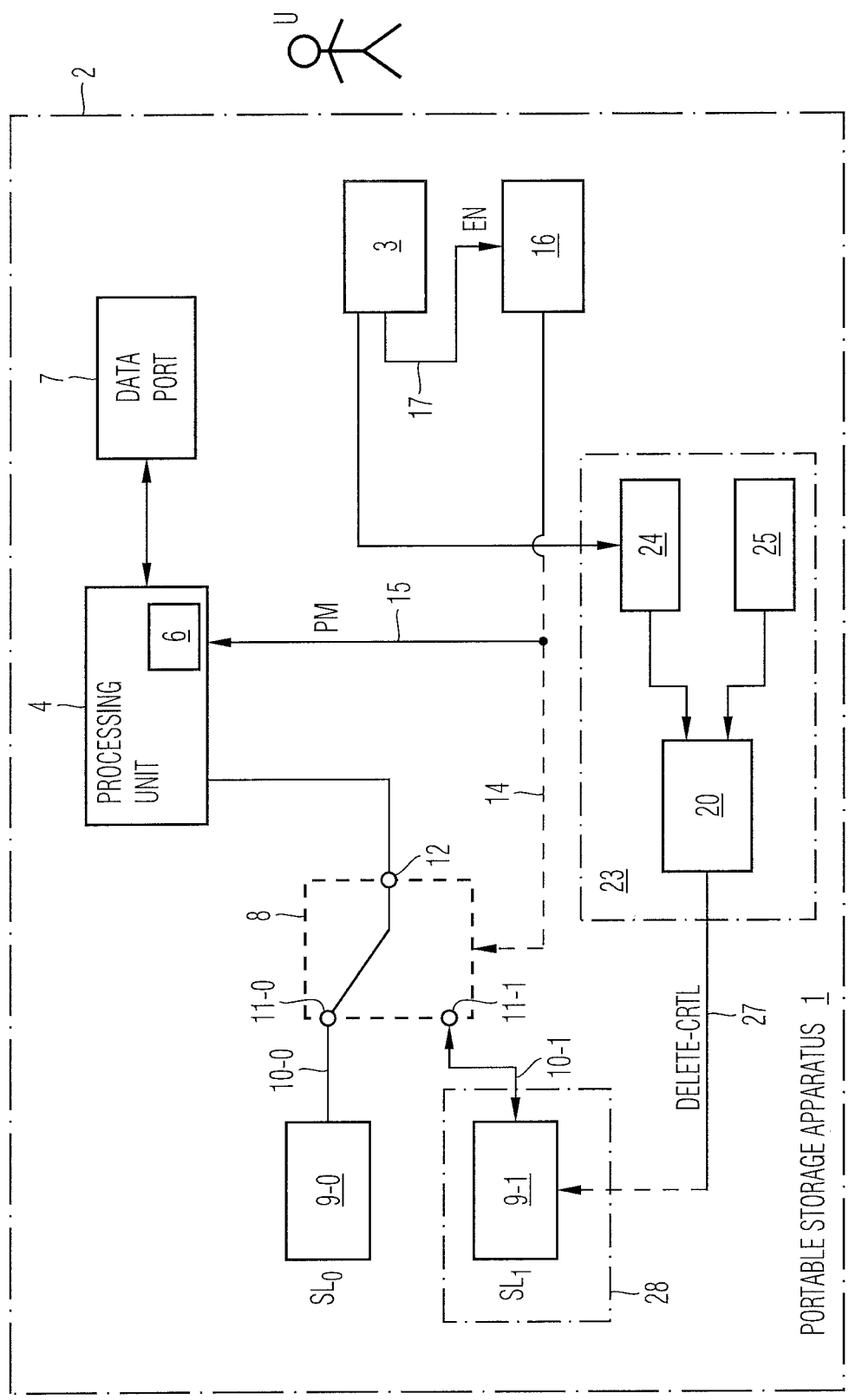
FIG. 8 shows a further block diagram of a possible exemplary embodiment of a portable storage apparatus according to the first aspect of the present invention.

FIG. 8 illustrates a further exemplary embodiment of the portable storage apparatus 1 according to the first aspect of the present invention. In the illustrated embodiment of FIG. 8, the portable storage apparatus 1 further comprises a protection logic 23 which is configured to count a number of unsuccessful authorization attempts made by a user or by an external device and is adapted to delete the encrypted sensitive data stored in the high security level data memory 9-1 if the number of unsuccessful authorization attempts exceeds a configurable threshold value TH. In the illustrated embodiment, the protection logic 23 comprises a counter 24 connected to the authorization unit 3 and adapted to count the number of unsuccessful authorization attempts made by a user or by an external device. The protection logic 23 further comprises a local memory or register 25 for storing a configurable threshold value TH. The protection logic 23 further comprises a comparator 26 which is configured to compare a counter value provided by the counter 24 with the threshold value TH stored in the register 25. If the counter value provided by the counter 24 exceeds the configuration threshold value stored in the register 25, the comparator 26 generates automatically a control signal which is supplied via a control line 27 to the high security level data memory 9-1 to delete automatically the encrypted high sensitive data. For instance, if a user or an external device performs several unsuccessful authorization attempts, the encrypted high sensitive data stored in the high security level data memory 9-1 is automatically deleted by the protection logic 23. In the embodiment illustrated in FIG. 8, the security can further be increased if the high security level data memory 9-1 is encapsulated in a tamper-proof casing 28. In a possible embodiment, the encrypted sensitive data stored in the high security data memory 9-1 is also automatically deleted if an intrusion into the housing 2 of the whole portable storage apparatus 1 and/or into the tamper-proof casing 28 of the high security level data memory 9-1 is detected by an intrusion detector.

Figure 9:
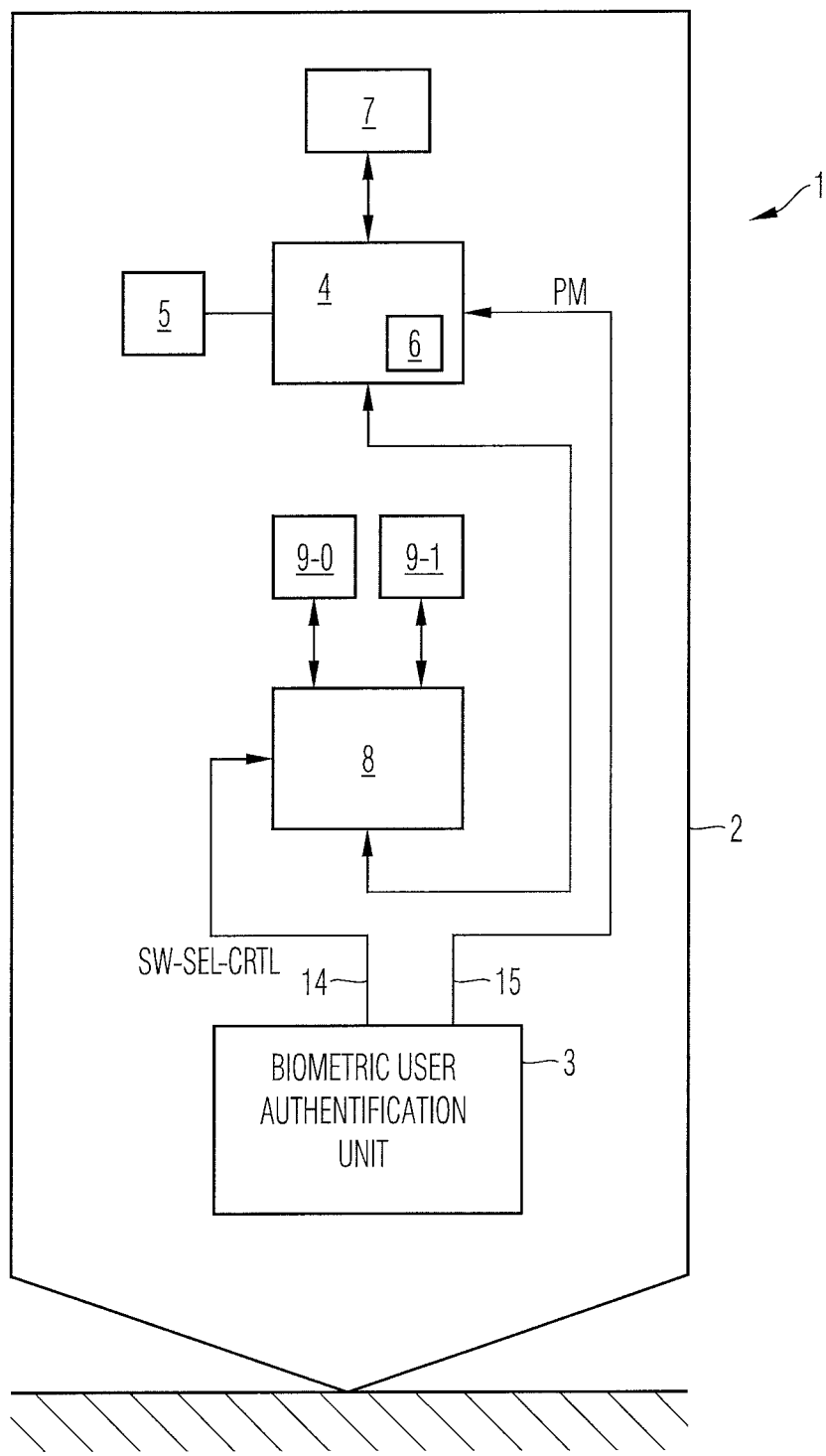
FIG. 9 shows a specific exemplary embodiment of a portable storage apparatus according to the first aspect of the present invention integrated in a pen.

FIG. 9 shows a further possible exemplary embodiment of a portable storage apparatus 1. In the illustrated embodiment of FIG. 9, the portable storage apparatus 1 is included in a housing 2 of a pen which can be handled by a user U, for instance for writing on a surface. In the illustrated embodiment, the pen includes a biometric authentication unit 3 adapted to authenticate a user using the pen for writing for instance his signature or a password based on sensed characteristics of the user's writing operation and/or on the basis of the writing result. The user U writing with the pen 2 on a surface such as paper performs a characteristic handling of the pen which is unique to the respective user U. The dynamics of the writing process is specific for each user when writing for instance a signature or a code word on the surface. The biometric user authentication unit 3 of the portable storage apparatus 1 illustrated in FIG. 9 can be hidden in the housing 2 of the pen. According to a possible embodiment, the pen can also form a camouflage product such that a third party does not become aware that a portable storage apparatus 1 is integrated in the housing 2. The pen may also comprise writing means which allows a normal writing on the surface such as paper, i.e. the pen can operate in a possible similar to a normal pen but including additionally the portable storage apparatus 1 according to the first aspect of the present invention. In a possible embodiment, the data port 7 of the pen can also be hidden and not be visible. For instance, the data port 7 can be hidden by a cap of the pen housing. A user U wishing to store sensitive data may authenticate himself by means of the biometric user authentication unit 3, for instance by writing his signature or a code word on a surface to authenticate himself. After the authentication process has been successfully accomplished, the user data can be stored in encrypted form into the high security level data memory 9-1. The portable storage apparatus 1 as illustrated in FIG. 1 can also comprise a selection unit 16 enabled by the biometric authentication unit 3. In a possible embodiment, the portable storage apparatus 1 as illustrated in FIG. 9 can also be connected to an external device for storing sensitive data in the high security level data memory 9-1.

Figure 10:
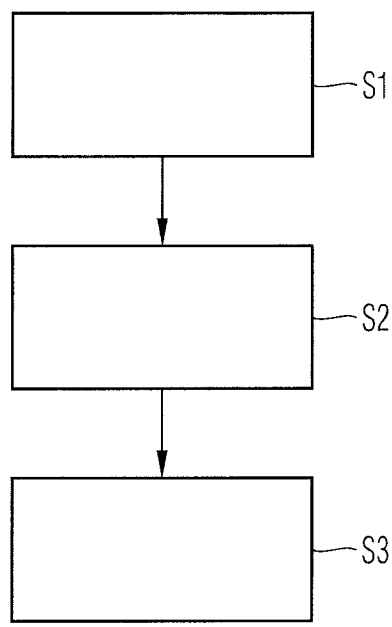
FIG. 10 shows a flowchart of a possible exemplary embodiment of a method for storing sensitive data according to a further aspect of the present invention.

FIG. 10 illustrates a flowchart of a possible exemplary embodiment of a method for storing sensitive data of a user or of a device.

In a first step S1, a user of a portable storage apparatus 1 and/or an external device connected to the portable storage apparatus 1 are identified. The authentication can be performed on the basis of biometric characteristics of the user or authentication data provided by the connected device. Different authentication mechanisms can be combined with each other. The authentication can be based on unchangeable characteristics of the user or device such as biometric data of the user. Further, the authentication can be based on knowledge, i.e. knowledge of a specific password or pin number of the user. Further, the authentication can take place on the basis of possession, e.g. possession of an authentication of a readable authentication tag readable by the portable storage apparatus 1.

In a further step S2, the sensitive data of the authenticated user and/or authenticated device are encrypted with a secure encryption key EK loaded from a key storage 5 of the portable storage apparatus 1. The encryption can be performed by an encryption logic 6A of a processing unit 4 integrated in the portable storage apparatus 1.

In a further step S3, the encrypted sensitive data is automatically stored in a high security level data memory 9-1 of the portable storage apparatus 1 if the high security level data memory 9-1 has been selected by the authenticated user and/or by the authenticated device.

In a possible embodiment, the sensitive data comprises test results TR generated by a test device 29 connected to the portable storage apparatus 1 as illustrated in the schematic diagram of FIG. 11. In the illustrated embodiment of FIG. 11, the portable storage apparatus 1 is connected to an external test device 29 used to test a device under test (DUT) 30. The device under test 30 can for instance be a prototype of a radio communication device. In the illustrated embodiment, the data port 7 of the portable storage apparatus 1 is connected to the test device 30 and can receive test results TR which are stored as sensitive data in encrypted form into the high security level data memory 9-1 of the portable storage apparatus 1. In a possible embodiment, the test device 29 comprises a local memory 31 which stores a unique test device identifier which can be connected to a test device authentication unit 3 which is configured to authenticate the connected test device 29 on the basis of the stored test device identifier. The test device authentication unit 3 controls the switching unit 8 as shown in FIG. 11. Test results TR received from the test device 29 and forming sensitive data are first encrypted by the encryption logic 6A of the processing unit 4 and then stored automatically into the high security level data memory 9-1 of the portable storage apparatus 1 if the authentication of the test device 29 has been performed successfully. The keys K used for the encryption can be loaded from the key storage 5. In a possible embodiment, different test devices 29 can be connected to the portable storage apparatus 1 each having a unique test device identifier. If any of the admissible test device identifiers are recognized by the test device authentication unit 3, the switching unit 8 connects the high security level data memory 9-1 with the processing unit 4. Other data of the test devices may be stored in the low security level data memory 9-0. In a possible embodiment, the key storage 5 can comprise different encryption and/or decryption keys K for different test devices 29.

The different embodiments of the portable storage apparatus 1 as illustrated in the figures can be combined with each other. For instance, the portable storage apparatus 1 illustrated in FIG. 11 can also comprise a higher number of security level data memories. It further can comprise besides the test device authentication unit 3 also a user authentication unit for a user. Moreover, the portable storage apparatus 1 shown in FIG. 11 may also comprise a selection unit 16 and/or a protection logic 23 as illustrated in FIG. 8. The portable storage apparatus 1 connected to the test device 29 can also be formed by a portable storage apparatus 1 having several components which can be separated from each other as illustrated in the embodiments of FIGS. 4, 5, 6A, 6B. Further, the memory 9-1 provided for the sensitive data can also comprise a tamper-proof housing and a corresponding intrusion sensor.

Further embodiments are possible. For instance, the high security level data memories used for high sensitive data can be formed by hidden data memories invisible to a third person. A third person getting hold of the portable storage apparatus 1 may not become aware that a high security level data memory is included in the housing 2 of the portable storage apparatus 1. For instance, the authentication unit 3 can also be formed by a hidden authentication unit in contrast to visible authentication units such as a fingerprint sensor. For instance, the hidden biometric authentication unit 3 can comprise acceleration sensors. For instance, if the housing 2 of the portable storage apparatus 1 is shaken by the user similar to a thermometer, the access to the high security level data memory 9-1 is activated. Further, the existence of a high security level data memory 9-1 or of a specific high security level data memory can be disguised by the design of the portable storage apparatus 1. For instance, if the selection unit 16 comprises only three buttons to select between three different security levels, the existence of a fourth security level with a fourth high security level data memory is disguised to a third person. For instance, in the embodiment of FIG. 7, the selection unit 16 may comprise a user interface with three selection buttons for selecting between three different security levels SL0, SL1, SL2. The fourth memory 9-3 with the highest security level SL3 can be disguised so that no selection key is provided for this security level SL3. In this embodiment, the selection unit 16 can comprise a separate acceleration sensor which provides a selection control signal to select the high security level data memory with the highest security level 9-3 only after the housing 2 of the portable storage apparatus 1 has been shaken by the user similar to a thermometer. Further, it is possible that the whole portable storage apparatus 1 is completely hidden in a camouflage product such as a pen or a lipstick. Additional security measures are possible. For instance, the high security encryption keys K can be changed or reconfigured after a certain time period, e.g. every day or weak. The data memories 9-*i* comprise nonvolatile memories and/or FLASH memories.

I claim:

1. A portable storage apparatus used for storing sensitive data of a user or of an external device, said portable storage apparatus comprising:
    an authentication circuit adapted to authenticate the user or the external device connected to the portable storage device;
    at least one processing circuit adapted to encrypt the sensitive data requiring a high security level, SL, with a secure encryption key, K, loaded from a key storage of the portable storage apparatus;
    wherein the processing circuit comprises:
    an encryption logic adapted to encrypt data received by a data port of said portable storage apparatus, wherein the encryption is performed depending on a current processing mode, PM, of the processing circuit using encryption keys, K, selected according to the current processing mode, PM, of the processing circuit, and
    a decryption logic adapted to decrypt encrypted data read from a data memory of said portable storage apparatus selectively switched by a switching circuit of the portable storage apparatus to the processing circuit in response to a security level selection control signal, SL-SEL-CRTL, using decryption keys selected according to the current processing mode, PM, of the processing circuit,
    wherein a high security level, SL, data memory and the at least one low security level, SL', data memory are connected to the switching circuit adapted to selectively switch one of the data memories to said processing circuit in response to the security level selection control signal SL-SEL-CRTL, generated by the authenticated user or by the authenticated external device,
    wherein the
    switching circuit is adapted to switch the processing circuit to the high security level, SL, data memory of the portable storage apparatus to store the encrypted sensitive data if the high security level, SL, data memory is selected by the authenticated user or by the authenticated external device.

2. The portable storage apparatus of claim 1, wherein the at least one low security level, SL', data memory is adapted to store encrypted or not encrypted less sensitive data requiring a lower security level, SL'.

3. The portable storage apparatus of claim 1 wherein the processing mode, PM, of the processing circuit is adjusted in response to the security level selection control signal, SL-SEL-CRTL, generated by the authenticated user or by the authenticated external device.

4. The portable storage apparatus of claim 1, wherein the authentication circuit is adapted to enable a security level, SL, selection circuit of said portable storage apparatus if a user or a connected external device has been successfully authenticated by said authentication circuit wherein the enabled security level, SL, selection circuit is adapted to generate the security level selection control signal, SL-SEL-CRTL, in response to a user selection input of a user or in response to a device selection input signal received from the external device.

5. The portable storage apparatus of claim 1, wherein the authentication circuit comprises a hidden or visible biometric authentication unit adapted to authenticate a user based on biometric characteristics of the user.

6. The portable storage apparatus of claim 1, wherein the authentication circuit comprises an interface to receive user authentication data input by the user or to receive device identification data of the external device to which the portable storage apparatus is connected.

7. The portable storage apparatus of claim 1, wherein the high security level, SL, data memory is surrounded by a tamper-proof casing, wherein the encrypted sensitive data stored in the high security level, SL, data memory is automatically deleted if an intrusion into a housing of the portable storage apparatus or into the tamper-proof casing of the high security level data memory is detected by an intrusion detector.

8. The portable storage apparatus of claim 1, wherein a protection logic is configured to count the number of unsuccessful authorization attempts made by a user or by an external device and to delete the encrypted sensitive data stored in the high security level, SL, data memory if the number of unsuccessful authorization attempts exceeds a threshold value.

9. The portable storage apparatus of claim 1, wherein the high security level, SL, data memory is provided in a separate plug-in storage component plugged into a basis storage component to connect the high security level, SL, data memory with the switching circuit provided in the basis storage component.

10. The portable storage apparatus of claim 1, wherein the portable storage apparatus is integrated in the housing of a pen including a biometric authentication circuit adapted to authenticate a user using the pen for writing based on sensed characteristics of the user's writing operation or writing results.

11. The portable storage apparatus of claim 1, further comprising at least one data port receiving input data encrypted by the encryption logic of the processing circuit and providing output data decrypted by the decryption logic of the processing circuit.

12. The portable storage apparatus of claim 11, wherein the data port is connected with an external test device to receive test results as sensitive data from the test device and wherein the authentication circuit is adapted to authenticate the external test device on the basis of test device identification data received from the test device.

13. The portable storage apparatus of claim 1, wherein the high security level, SL, data memory is a hidden data memory.

14. The portable storage apparatus of claim 1, wherein the whole portable storage apparatus or at least a separate plug-in storage component including the high security level, SL, data memory of the portable storage apparatus is integrated in or enclosed by a camouflage product.

15. A test system, comprising:
a test device adapted to test at least one device under test,
a portable storage apparatus used for storing sensitive data of a user or of an external device and connectable to the test device and adapted to store test results, TR, generated by the test device as sensitive data in encrypted form in a high security level, SL, data memory of the portable storage apparatus, said portable storage apparatus comprising:
an authentication circuit adapted to authenticate the user or the external device connected to the portable storage device;
at least one processing circuit adapted to encrypt the sensitive data requiring a high security level, SL, with a secure encryption key, K, loaded from a key storage of the portable storage apparatus;
wherein the processing circuit comprises:
an encryption logic adapted to encrypt data received by a data port of said portable storage apparatus, wherein the encryption is performed depending on a current processing mode, PM, of the processing circuit using encryption keys, K, selected according to the current processing mode, PM, of the processing circuit, and
a decryption logic adapted to decrypt encrypted data read from a data memory of said portable storage apparatus selectively switched by a switching circuit of the portable storage apparatus to the processing circuit in response to a security level selection control signal, SL-SEL-CRTL, using decryption keys selected according to the cur-rent processing mode, PM, of the processing circuit,
wherein a high security level, SL, data memory and the at least one low security level, SL, data memory are connected to the switching circuit adapted to selectively switch one of the data memories to said processing circuit in response to the security level selection control signal SL-SEL-CRTL, generated by the authenticated user or by the authenticated external device,
wherein the
switching circuit is adapted to switch the processing circuit to the high security level, SL, data memory of the portable storage apparatus to store the encrypted sensitive data if the high security level, SL, data memory is selected by the authenticated user or by the authenticated external device.

16. A method for storing sensitive data of a user or of a device, the method comprising:
authenticating a user of a portable storage apparatus or a an external device connected to the portable storage apparatus;
encrypting the sensitive data of the authenticated user or authenticated external device, respectively by an encryption logic of a processing circuit of the portable storage apparatus, with a secure encryption key, K, loaded from a key storage of the portable storage apparatus and selected according to a current processing mode, PM, of the processing circuit; and
storing the encrypted sensitive data in a high security level, SL, data memory of the portable storage apparatus or a low security level, SL', data memory of the portable storage device to which the processing circuit is switched in response to a security level selection control circuit signal SL-SEL-CRTL generated by the authenticated user or by the authenticated external device.

17. The method of claim 16, wherein the sensitive data comprises test results generated by a test device connected to the portable storage apparatus.

18. The method of claim 16, wherein the encrypted sensitive data is automatically deleted from the high sensitive level, SL, data memory if an intrusion into the housing of the portable storage apparatus or into a tamper-proof casing of the high security level, SL, data memory is detected.

* * * * *